Dec. 9, 1969  R. A. HEATON  3,482,724
COMPOSITE CONTAINERS
Filed Feb. 13, 1968  5 Sheets-Sheet 3
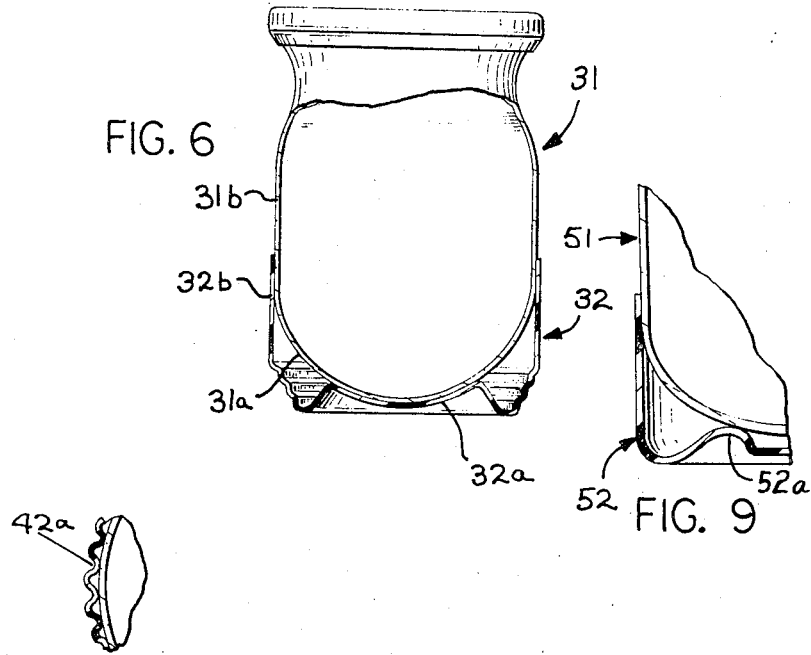
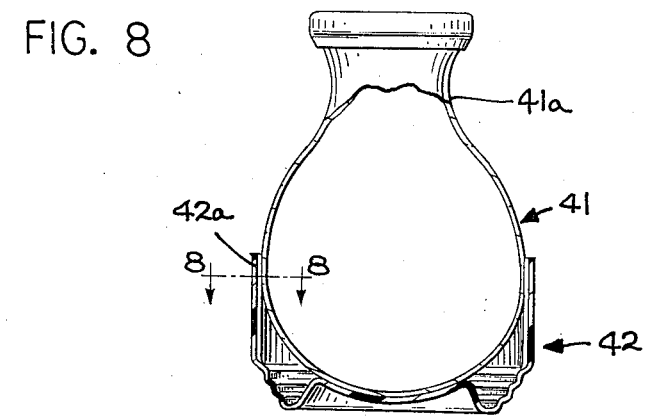
INVENTOR.
RICHARD A. HEATON
BY J. R. Nelson and
W. A. Schaich
ATTORNEYS Dec. 9, 1969  R. A. HEATON  3,482,724
COMPOSITE CONTAINERS
Filed Feb. 13, 1968  5 Sheets-Sheet 4

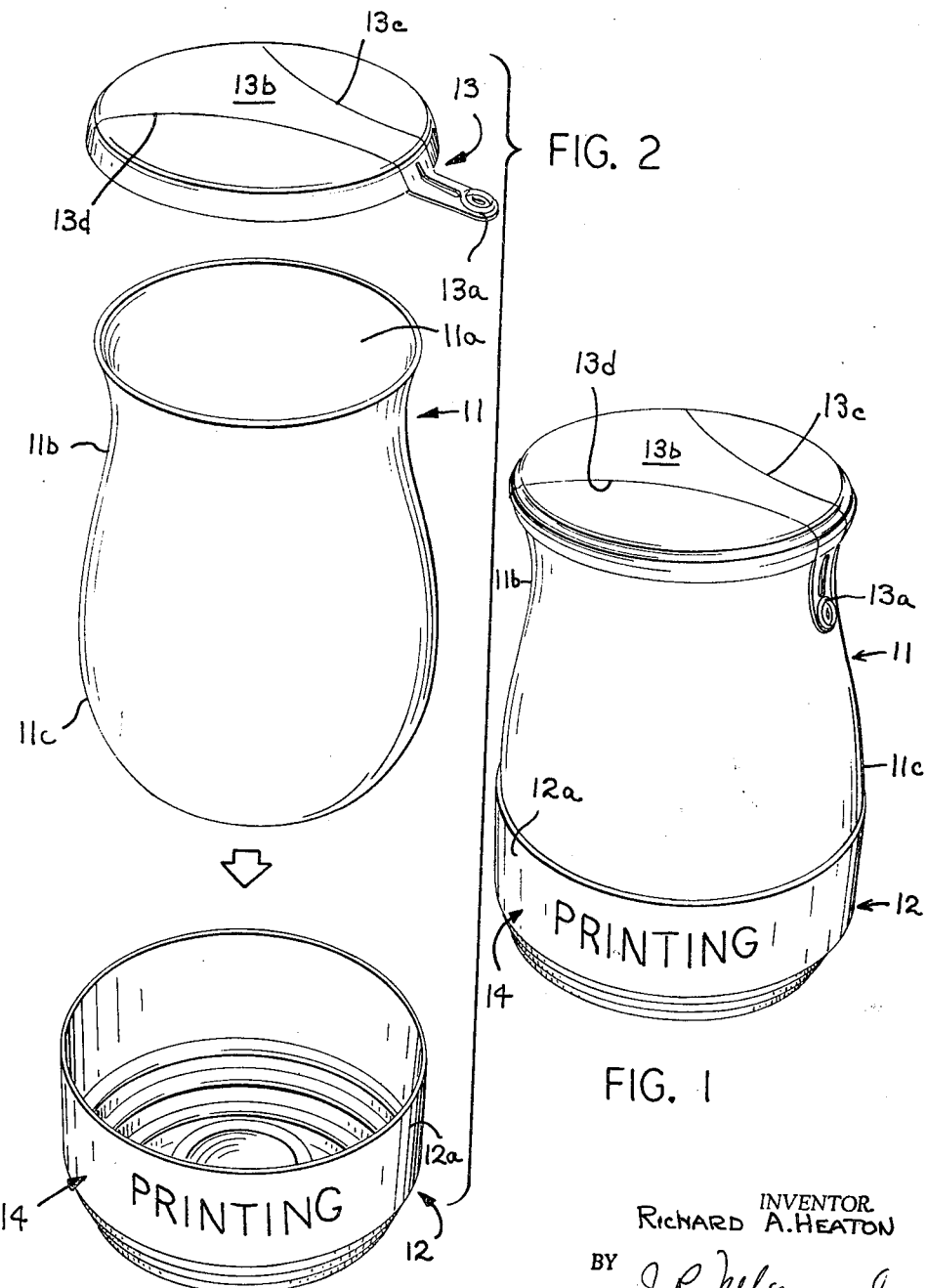

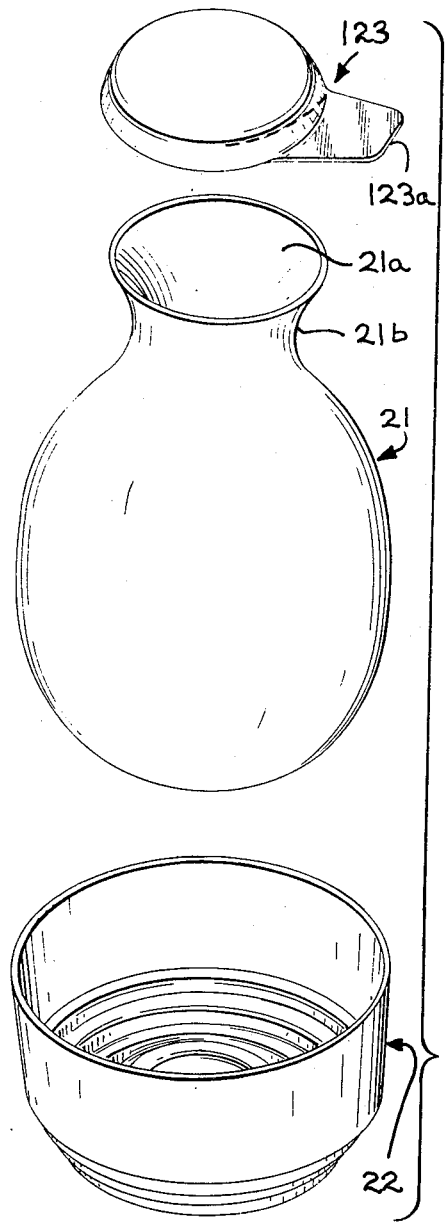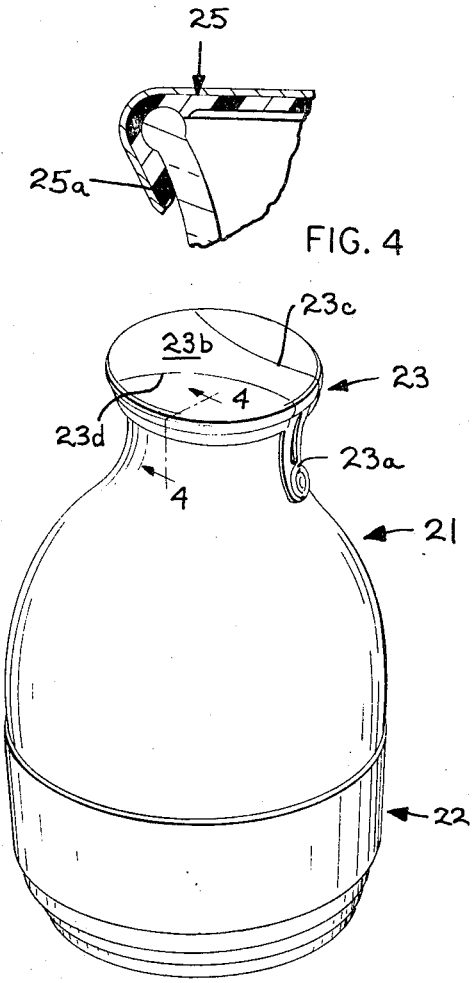

INVENTOR.
RICHARD A. HEATON
BY J. R. Nelson and
W. A. Schaich
ATTORNEYS

Dec. 9, 1969  R. A. HEATON  3,482,724
COMPOSITE CONTAINERS
Filed Feb. 13, 1968  5 Sheets-Sheet 5

INVENTOR.
RICHARD A HEATON
BY J.R. Nelson and
W.A. Schaich
ATTORNEYS

United States Patent Office 3,482,724
Patented Dec. 9, 1969

3,482,724
COMPOSITE CONTAINERS
Richard A. Heaton, Toledo, Ohio, assignor to Owens-Illinois, Inc., a corporation of Ohio
Continuation-in-part of application Ser. No. 538,735, Mar. 30, 1966. This application Feb. 13, 1968, Ser. No. 705,214
Int. Cl. B65d 23/08, 11/28
U.S. Cl. 215—10
11 Claims

ABSTRACT OF THE DISCLOSURE

The present invention relates to a new and novel package which is comprised of a composite container having a special type of glass vessel that is thin and has substantially uniform wall thickness and distribution; and a supporting base fitment. The vessel is designed for maximum strength for a given glass wall thickness by virtue of the seamless, generally spherical lower portion of glass vessel, the extent of the intermediate section that includes an upwardly curved or tapered portion and the pinched and outwardly flared neck portion that terminates in a rim or finish defining a mouth opening for the vessel. A closure is positioned on the mouth opening to seal contents in the package. The neck portion presents the minimum diameter in horizontal section of the vessel. The fitment provided for support of the container is constructed of a less frangible material to support the frangible glass in the bottom portion of the vessel and has a wall defining a bottom support cup. The fitment is vented in the central region of its bottom support cup and the vertical cylindrical wall of the fitment snugly engages the glass wall in the lower portion of the glass vessel. In assembly, the fitment is fastened to the glass so that preferably the two components of the package are incapable of disassembly by the user.

---

The present application is a continuation-in-part of my application Ser. No. 538,735, filed Mar. 30, 1966, now United States Patent No. 3,372,826, and assigned to the assignee of the present application.

This invention relates to a container of composite construction. More particularly, the invention relates to a container having a bulbously-shaped glass envelope for containing the packaged product and a base member of non-frangible material for protecting the glass envelope and maintaining it in an upright position.

In a preferred construction of such a container, the base member provides a surface which is well-situated to receive printing or other decorative matter, thereby to eliminate the need for placing such printing matter on the glass, either directly or by way of a separately-adhered paper or foil label, with the well-known problems and disadvantages attendant thereto. Additionally, the container envelopes may be formed in large quantities at high speed by a process similar to the ribbon process used in the forming of light bulb envelopes and wherein the wall of each envelope is of a more uniform and substantially reducel thickness in relationship to the wall portions of a conventional hot-iron mold blown glass bottle or jar. Such a high-speed forming process will result in manufacturing costs which compare favorably to the costs of conventional container forming processes and the features of a thin wall of more uniform thickness and of a bulbular configuration provide containers of improved thermal shock resistance, even when such envelopes are formed from a glass composition of a relatively high coefficient of thermal expansion. Obviously, improved thermal shock resistance helps to minimize breakage when such containers are immersed in a hot liquid for washing or sterilization, filled with a product at elevated temperature, or rapidly cooled from an elevated processing temperature. Another important feature of a container of reduced and more uniform wall thickness is that the resulting reduction in weight of glass used in a container of a given size, in relationship to the weight of a conventional glass container, makes it economically feasible where desired, to form such envelope from a glass composition of higher quality, and hence cost, than the customary soda-lime glasses used in the forming of conventional glass bottles and jars. This makes it possible to obtain even better thermal shock resistance, if desired, and/or makes it possible to use various known additives in the glass composition for the purpose of improving the strength, appearance, light transmission, chemical attack resistance or other properties of the glass.

As a further feature of the present invention, the glass envelope in a composite container such as that described above, or at least a major portion of such envelope, may be provided with an essentially spherical configuration, or at least as close an approximation thereto as the designer wishes. The improved structural properties afforded to the container by such a configuration make it extremely well suited for the packaging of products which normally exihibit high pressure during shipment and storage such as beer or other malt beverage products, carbonated beverages, or aerosols.

For a further understanding of the present invention and the objects thereof, attention is directed to the following portion of the specification, the drawing, and the appended claims.

In the drawing:

FIG. 1 is a perspective view of an embodiment of a wide-mouth composite container constructed in accordance with the present invention;

FIG. 2 is a perspective view of certain of the elements of the container of FIG. 1 in disassembled relationship;

FIG. 3 is a perspective view of an embodiment of a narrow-mouth composite container constructed in accordance with the present invention;

FIG. 4 is a fragmentary sectional view taken on line 4—4 of FIG. 3;

FIG. 5 is a perspective view of certain of the elements of the container of FIG. 3 in disassembled relationship;

FIGS. 6 and 7 are elevational views, partly in section, of additional wide-mouth and narrow-mouth composite containers constructed in accordance with the present invention, respectively;

FIG. 8 is a sectional view taken at line 8—8 of FIG. 7;

FIG. 9 is a fragmentary sectional view of yet another embodiment of a composite container constructed in accordance with the present invention;

Figure 11:
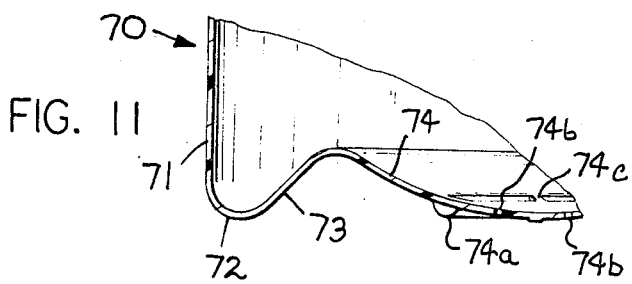
FIG. 11 is an enlarged partial sectional view of the lower portion of the base member shown in FIG. 10.

In accordance with the present invention there is provided a composite container comprising a glass envelope which terminates in an open mouth at its upper end and which has a bulbularly-shaped bottom portion that causes the envelope to be unstable in its upright position. Extending upwardly from the bottom portion is an intermediate portion which merges smoothly with a neck portion of concavely curved (reverse curvature) configuration. The neck region presents the smallest diameter of the glass envelope. Upwardly from the concavely contoured neck portion is a radially outwardly flared portion of the neck which terminates in a finish flange or rim that defines the mouth (orifice) of the glass envelope. The structure and configuration of the glass envelope are important features of the invention contributing to the strength of the glass envelope portion of the composite container. The flared neck design of the vessel enhances overall drinking characteristics. The container further comprises a cup-shaped bottom or base member formed of a material substantially less frangible than the glass of the envelope, which member is secured to and snugly engages the lower portion of the glass envelope to support it in its upright position and to protect it from impact with objects and articles of many types including adjacent containers of the same type, for example, in a shipping carton filled with such containers, or in a filling line. In the composite container of FIGS. 1 and 2, the glass envelope thereof is designated by numeral 11 and the base member by numeral 12. Additionally, such a container, after introduction of the packaged product into the envelope thereof through a mouth or aperture 11a in an upper minor portion 11b thereof, is desirably sealingly closed by a closure of any suitable construction. In the container of FIGS. 1 and 2, the closure is designated by numeral 13 and is shown as a convenience-type metallic closure having a downwardly extending and upwardly deflectable tab 13a that is attached to a medial portion 13b of the top panel which is separated from the remaining portions of the top panel by weakened and readily rupturable lines 13c and 13d.

Envelope 11 of the container of the present invention may be formed of a wide variety of known glass compositions including the relatively inexpensive soda-lime glass compositions used in forming conventional glass bottles and jars and other glass containers. Envelope 11 differs from prior art glass containers, however, in that the wall thereof is substantially thinner than the wall even of a lightweight glass container such as the popular non-returnable beer bottle, and the distribution of glass in the wall is considerably more uniform. For example, it is highly desirable and entirely feasible if the average wall thickness of the envelope of a container in accordance with the present invention be in the range of 0.035–0.050 inch when such envelope is formed of a soda-lime glass composition. Envelopes such as envelope 11 with reduced and more uniform wall thickness in relationship to prior art glass containers may be economically formed at high speed by the ribbon forming process used in the forming of electric lamp bulb envelopes, as generally disclosed in U.S. Patent No. 1,790,397 (to W. J. Woods et al.), and in Handbook of Glass Manufacture, page 356, by F. V. Tooley (1953). This forming process is a paste mold process in which the glass heat content is removed through a steam layer, hence at a lower rate than in a hot-iron mold process. This lower heat transfer rate reduces the formation of stresses in the formed article. The reduced and more uniform wall thickness further imparts improved thermal shock resistance to the envelope, relative to a prior-art glass container, even when the envelope is formed of a glass of comparable coefficient of thermal expansion.

The lower and major portion of the envelope 11, designated by reference character 11c, is constructed with an outline approximating that of a major section of a sphere, a configuration readily obtained in the ribbon forming process heretofore mentioned. If, for reasons of design or otherwise, it is desirable to depart from a true spherical configuration in forming portion 11c, it is, nonetheless, quite structurally important that a lower and major portion of envelope 11 be of a substantially circular configuration in horizontal section at every elevation of such portion and that such portion be substantially continuously convexly arcuate in all axial sections (vertical planes passing through the central vertical axis of the envelope), of the envelope. It is to be noted that the use of a small flattened surface portion (not shown) in the lower portion 11c of the envelope, for example one of a diameter materially less than one-half of the major diameter of the envelope, may be of benefit in providing a locating or registration point for post-forming operations and an envelope with such a flattened surface portion is to be considered to be within the scope of the terms "substantially circular" or "substantially continuously convexly arcuate" as such terms have been hereinbefore used. In any event, the flattened surface portion will be of insufficient extent to provide satisfactory stability to the container in its upright position and the radius of the wall approaching such flattened surface will, desirably, be of gradually increasing length to avoid abrupt changes in radius of curvature.

Base member 12 of the container of the present invention securely engages a lower portion of envelope 11 thereof to support the envelope with stability in its upright position and to protect such engaged portion from impact damage. To this end, base member 12 must, of course, have a level lowermost extent (e.g. a flat base) and it must be constructed of a material substantially less frangible (more resistant to shock breakage) than glass. It is also desirable for the material to be capable of appreciable deformation under impact load to minimize the transmission of impact forces through the base member to the glass envelope. The popular thermoplastic materials, such as low and medium density polyethylene, incorporate these desirable properties to a large degree and are relatively inexpensive and readily formable by well-known production or molding techniques. The use of other materials in the formation of base member 12 including other thermoplastic materials, paper, molded pulp, plastisol formed in place, foamed plastics, and thermosetting plastics, as well as composites of any of such materials, is also contemplated. The use of various metallic materials, such as tinplate and aluminum, can also be satisfactory if suitable cushioning techniques are employed.

If envelope 11 of the container of the present invention is to be positively protected from such surface abuse, such as impact damage caused by contact with adjacent containers in a shipping carton or in a filling line, it is important to provide base member 12 with a side wall portion 12a which extends upwardly at least to the major diameter of envelope 11. Such a construction feature is additionally advantageous in that the cylindrical outer surface of portion 12a which may thereby be provided is well situated for the placement of descriptive, advertising or other decorative material, as shown generally at 14 in FIGS. 1 and 2, thereby eliminating the need for the placement of such decorative material on the glass surface of envelope 11. This is particularly advantageous when the base member is formed of pigmented polyethylene (or other plastic) for example, because it makes it possible to do such decoration with fast curing organic inks which results in a more opaque decoration than the decoration obtained on a glass surface when popular printing inks are used. Furthermore, when the wall of base member 12 extends upwardly to the major diameter of envelope 11, assembly of the base member and the envelope may be facilitated by forming base member 12 of a heat shrinkable plastic material and by heating it after the envelope has been placed therein; additionally or alternatively, such assembly may be accomplished by the use of an adhesive suitable to bond glass to the material of the base member, e.g., an epoxy resin adhesive, or by a simple shrink-fit of the base member over envelope.

In the embodiment of the invention illustrated in FIGS. 3–5, there is provided a glass envelope 21 which is generally the same as envelope 11 of the embodiment of FIGS. 1 and 2 except that the upper minor portion 21b thereof is narrower to define a narrow-mouth 21a therefor. Base member 22 of the embodiment of FIGS. 3–5 can be considered to be identical to base member 12 of the embodiment of FIGS. 1 and 2.

In FIGS. 3 and 4, mouth 21a of envelope is shown as being closed by a closure 23 which is similar to closure 13 in that it incorporates an upwardly deflectable tab 23a attached to a removable medial portion 23b, as defined by weakened lines 23c and 23d, of the top panel of the closure. As is shown in FIG. 4, attachment of closure 23 to open mouth of envelope 21 may be facilitated by providing a liner cap 25 of resilient material, such as polyethylene, which has a downwardly and inwardly extending flange 25a, to snugly engage the upper portion of the rim of envelope 21 and over which closure 23 is placed. Such a liner cap may also be used in other embodiments of the present invention if desired.

As is shown in FIG. 5, it is also contemplated that narrow-mouth embodiments of containers in accordance with the present invention may also, when desired, be provided with other well-known convenience-type closures such as manually removable closure 123 which has a stiff outwardly extending removal tab 123a similar to that in use in some prior art crown closure constructions.

FIG. 6 illustrates an embodiment of a container in accordance with the present invention in which the envelope 31 thereof is provided with a hemispherical bottom portion 31a, a feature common to other envelope configurations, and a cylindrical portion 31b immediately thereabove. Because of its departure from the optimum configuration of a sphere by virtue of the incorporation of cylindrical portion 31b, envelope 31 is not as well suited for the packaging of pressurized products, such as carbonated soft drinks and malt beverage products, as are other of the illustrated envelope configurations. For example, FIG. 7 illustrates an embodiment wherein envelope 41 has about as close an approximation to the configuration of a sphere as can be provided consistent with the provisions of a suitable neck portion 41a.

A number of design features can be provided in the construction of a base member or fitment for use in the practice of the present invention which improve the ability of the base member to absorb impact. For example, in the embodiment of FIG. 6, fitment 32 has a bottom spherical surface portion 32a which contacts an adjacent surface portion of envelope 31 in surface-to-surface contact and a cylindrical surface portion 32b spaced from portion 32a which likewise contacts a portion of envelope 31 in surface-to-surface contact. Thus, fitment 32 between portions 32a and 32b is free to deflect under impart to absorb loads which otherwise would be transmitted to envelope 31. In some cases, further impact absorbing properties can be imparted to the base member or fitment of the present invention by constructing the fitment to contact the adjacent envelope only in point or line contact. Thus, the upstanding wall 42a of base member 42 of the embodiment of FIGS. 7 and 8 is of corrugated construction to minimize the area of contact of envelope 41 therewith and the bottom of base member 52 of the embodiment of FIG. 9 is shaped with an upstanding annular protuberance 52a to contact the lower portion of associated envelope 51 in the pattern of a thin circumferentially extending ring.

Figure 12:
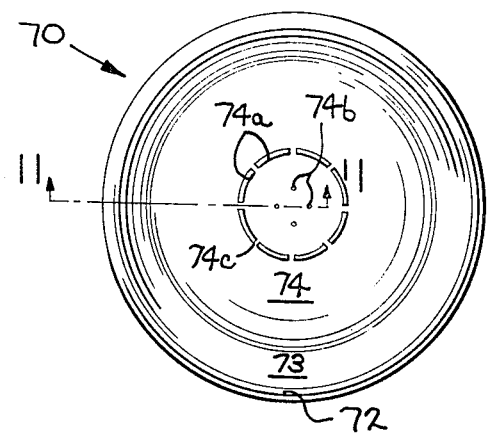
FIG. 12 is a bottom plan view taken along line 12—12 of FIG. 10.
Figure 10:
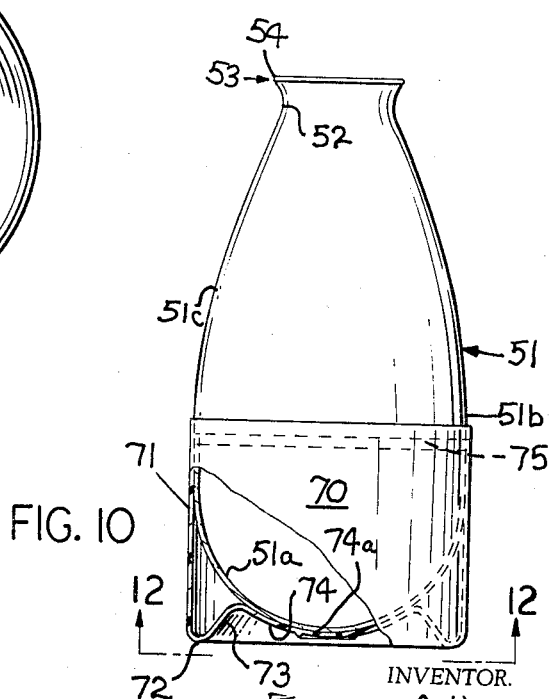
FIG. 10 is an elevational view, partly in section, of a composite container embodying further features of the present invention.

A further embodiment of the invention preferred for many uses is shown by FIGS. 10–12. As shown in FIG. 10, the envelope 51 has a substantially hemispherical bottom portion 51a which merges into a substantially cylindrical intermediate portion 51b of the envelope. Extending upwardly from the cylindrical portion 51b is a substantial tapered portion 51C of the envelope that is convexly curved toward the axis of envelope 51. The curvature of this portion is continuously convex until the narrowest section (in a horizontal plane)—minimum diameter—of the envelope occurs at the neck 52. Above neck 52 the envelope flares outwardly along the segment 53 and terminates in an annular finish or rim 54. This rim in its preferred form is a so-called bead-type finish which occurs in finish forming the glass envelope 51.

In the configuration of the various glass envelopes disclosed herein, its maximum diameter horizontal section occurs in the lower vertical one-half of the height of the envelope. The minimum diameter horizontal section of the envelope occurs in the flared neck region. This minimum diameter is in the upper vertical one-half of the height of the envelope.

In the embodiment of FIG. 10, the maximum diameter horizontal section of the envelope 51 is below one-half the vertical height of said envelope when disposed in an upright position. The major volume or capacity of the container is below its vertical midpoint and the center of gravity is below this point substantially, thusly, adding a stability factor.

In the manufacture of the glass envelope of the present invention, the glass is attached to a glass "ribbon" from which the envelope is formed. In the molding of the envelope, such as 51, a moile portion is formed intermediate the edge or rim at 54 and the glass ribbon. This envelope 51 and its moile portion (not shown herein) are separated at the ribbon by a suitable well-known crack-off technique. The remaining article 51 and moile are subsequently separated and the finish rim 54 formed thereby when the moile is "burned-off" from the envelope 51. This burn-off operation is known and practiced in the art of forming glass tumblers or tableware.

In the just referred to embodiment of the invention, a preferred form of fitment (base) 70 is provided. This fitment 70 has a cylindrical vertical wall 71 which extends to the portion of the glass envelope 51 at or above the maximum diameter of the hemispherical segment 51a. Fitment 70 thereby prevents sidewise glass-to-glass contact between adjacent containers and prevents such abrasive contact thereat preserving strength of the glass. The size of the cylindrical wall 71 is such that it tightly engages the glass in the upper region of the fitment and a suitable means of securing the fitment 70 onto the glass envelope 51 is provided, such as described earlier herein. Fitment 70 has a lower level surface 72 which is the lowermost surface of an annulus or ring as shown in FIG. 10, but may assume other configurations near the outer edge of the fitment. This will be the level surface for stability of the composite container.

Inwardly of the bearing surface or ring 72 is an upwardly, inwardly directed wall 73 which is spaced from wall 71 to provide the push-up region of the bottom wall of fitment 70. This wall 73 extends to an inner, conforming, spherically-contoured bottom support wall 74 which provides a yieldable bearing support inside the fitment for the envelope. This bottom support wall 74 also provides a nesting surface for the bottom end portion of the glass envelope 51. Along bottom support wall 74 may be provided an annular arrangement of channels in the wall 74 which are arcuate grooved portions (viewed from above), or downwardly directed, convex protuberances (viewed from below), as at 74a (shown best in FIG. 11). Portions 74a are in an interrupted circular array as shown in FIG. 12. Intermediate the arcuate portions (protuberances) 74a are spanning wall sections 74c appearing as radially extending webs (FIG. 11). Webs 74c reinforce the channel-like protuberances without thickening their wall sections. As such, the molding of the fitment is made easier and less material need be used for comparable strengths. This construction distributes the load of container 51 in fitment 70 and eliminates point loading which may be undesirable in crowning or capping operations as follows. The lower edges of the channels 74a are disposed below the interior radial center of the support wall structure immediately surrounding the vent apertures 74b. As the glass envelope is top loaded, the walls 71 and 73 will deflect and the protuberances 74a will ultimately engage the underlying support surface. Because the protuberances are semicylindrical in cross-section, the wall of protuberances 74a will flex inwardly under the top load to first distribute the load in substantially annular configuration before the end point of the spherical bottom end of the glass envelope is bottomed on the under support surface and point loading occurs. This feature of the base member's structure is very advantageous in capping the container for the reason noted earlier.

Fitment 70, in its assembly with glass envelops 51 (FIGS. 10–12), should be vented in the region illustrated by means of vent holes 74b. After the glass envelope is pressed into assembly with the fitment to the relationship shown on FIG. 10, vent holes 74b may be sealed. This can be accomplished by spotting dots or spots of adhesive on the lower outer surface of the bulbular envelope 51a in substantial registry with the vents. A suitable hot melt adhesive or polyvinyl acetate-polyvinyl alcohol type polymer adhesive may be used. One well-known example of such material is sold presently by Borden and Company under the trademark "Elmer's Glue."

If desired, the fitment 70 may be adhesively secured to glass envelope 51 by placing a band of the hot melt adhesive, as shown in the phantom outline at 75 in FIG. 10. The two adhesive applications may be made jointly or severally to attach the elements of the composite container. It is preferred in the invention that the fitment 70 and the glass envelope 51 not be readily detachable by the user for obvious reasons.

Figure 13:
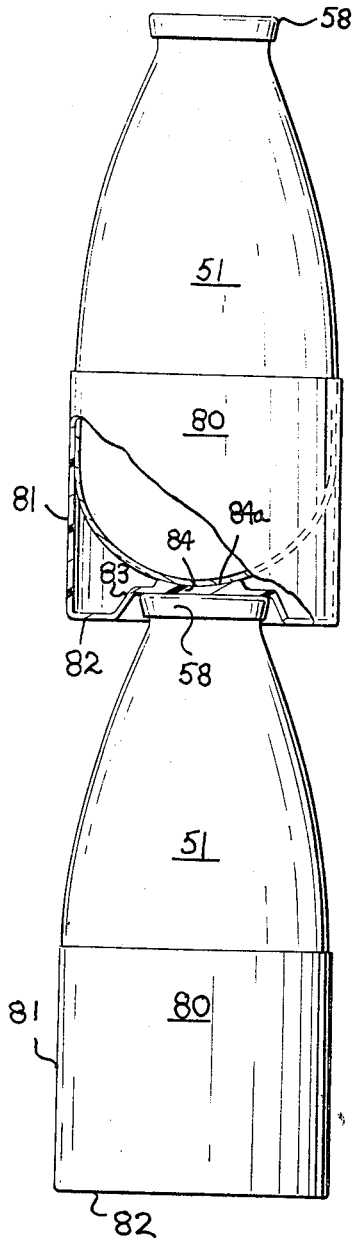
FIG. 13 is an elevational view, partly in section, illustrating a stacking feature of the present invention.

A further feature of the invention is illustrated in FIG. 13. In this instance, the fitment 80 is formed similarly to the just-described fitment 70 in that it has the cylindrical vertical wall 81 and merges with a lower level surface 82 for supporting the composite container on a flat support. Inwardly of the surface 82 is the upwardly, inwardly sloped wall 83 which merges with the radial inner bottom supporting wall having a span 84. This central span of the bottom supporting wall has a conforming contour 84a which nestingly supports the bottom end, spherical surface of the glass envelope. The span 84 in this instance has a substantially flat lower surface for bearing support on an underlying container at its upper end closure 58. Thus, the fitment 80 provides a stacker bottom for stacking closed composite containers (58, 51 and 80 collectively) in vertical array.

In the foregoing structures of fitments 70 and 80, the bearing support 74 or 84 for the glass envelope is a push-up segment maintaining the lower end of the glass envelope in spaced relationship to the support surface (such as a shelf surface) when the composite container is supported by its respective surfaces 72 or 82. The bearing support surface is yieldable through the taper walls 73, 74 or 83, 84 respectively, of the illustrated constructions to absorb shock or headloads on the glass part of the container, as pointed out earlier.

The best mode known to me to carry out this invention has been described above in terms sufficiently full, clear, concise and exact as to enable any person skilled in the art to make and use the same.

I claim:

1. A container of composite construction comprising, in combination: a glass envelope having a mouth which, when said envelope is disposed in an upright position, is at the upper extremity thereof, the wall of said envelope being seamless, relatively thin and of substantially uniform thickness and distribution, and also being circularly shaped in its horizontal sections, said wall being substantially continuously convexly arcuate along a bottom portion of substantial extent, said bottom portion extending vertically to a maximum diameter horizontal section, said wall tapering inwardly from the maximum diameter horizontal section with convex curvature toward the axis of said envelope and to a concavely arcuate neck portion, said neck portion having an outwardly flared portion terminating in a finish rim at said mouth opening, said concavely arcuate neck portion being the minimum diameter horizontal section of the glass envelope, when the envelope is disposed in the upright position, said maximum diameter horizontal section of the bottom portion occurring in the lower one-half of vertical height of said envelope and the minimum diameter horizontal section thereof occurring in the upper one-half of vertical height of said envelope; and a base member formed of a material that is less frangible than said envelope, said base member having an upstanding cylindrical wall portion tightly engaging the bottom portion of said envelope and having a level bottom surface for supporting said glass envelope in an upright position with stability, and an annular ring of adhesive material on the interior surface of the vertical wall of said base member adhesively attaching the base member and the glass envelope thereat, whereby the base member is permanently secured to the glass envelope to form a composite package.

2. A composite container comprising a glass envelope having a mouth opening at the one end thereof, the wall of said envelope being substantially continuously convexly arcuate in an axial section along a substantial extent of its end portion disposed opposite said mouth, said envelope thereby being unstable in the upright position, and a generally cup-shaped base member formed of a material substantially less frangible than the glass of said envelope, said base member comprising a generally circular-shaped in horizontal section upstanding wall and an adjoined level end surface, the upstanding wall tightly engaging the glass envelope along the outer surface of its said opposite end portion to support the glass envelope in a stable upright position, the base member including a bottom support wall contoured for nestingly engaging the corresponding lower extent of said arcuate end portion of the glass envelope and supporting the latter thereby in a region substantially axially disposed at the lower end of the glass envelope, the bottom support wall conforming substantially to the contour of said end portion of the envelope and having bent means thereat for exhausting air displaced upon assembly of said envelope and base member, said bottom support wall being spaced inwardly and upwardly from the plane of said level end surface of base member, a sealant to close the vent means and seal the space between the glass envelope and the wall of the base member from communication with the exterior of the base member thereby preventing entry of contaminants therein after the envelope and base member are assembled as a composite container, said sealant comprising a film of adhesive applied to the vent means at the time of assembly of said envelope and base member and carried to the vent means for said sealing by the exterior lower surface of said glass envelope during assembly, and the level end surface and said bottom support wall of the base member being joined by an inwardly and upwardly extending wall, the latter providing a yieldable mounting for the envelope in said base member.

3. A composite container comprising a glass envelope having a mouth opening at the one end thereof, the wall of said envelope being substantially continuously convexly arcuate in an axial section along a substantial extent of its end portion disposed opposite said mouth, said envelope thereby being unstable in the upright position, and a generally cup-shaped base member formed of a material substantially less frangible than the glass of said envelope, said base member comprising a generally circular-shaped in horizontal section upstanding wall and an adjoined level end surface, the upstanding wall tightly engaging the glass envelope along the outer surface of its said opposite end portion to support the glass envelope in a stable upright position, the base member including a bottom support wall contoured for nestingly engaging the corresponding lower extent of said arcuate end portion of the glass envelope and supporting the latter thereby in a region substantially axially disposed at the lower end of the glass envelope, the bottom support wall conforming substantially to the contour of said end portion of the envelope and spaced inwardly and upwardly from the plane of said level end surface of the base member, the level end surface and said bottom support wall being joined by an inwardly and upwardly extending wall, the latter providing a yieldable mounting for the envelope in said base member, said bottom support wall including annularly arranged downwardly extending substantially arcuate channels extending axially below the radial interior extent of the support wall and interiorly of said annular channels, said bottom support wall having one or more axial vent passages for aiding assembly of said envelope and said base member.

4. The container defined in claim 3, which includes plural arcuate channels each separated from the other by a radially extending web, said channel structure distributing vertical loading on the container away from the radial, lowermost, center point of the bottom supporting wall, said separating webs supporting the bottom supporting wall of the base member thereat.

5. The container defined in claim 3, wherein the bottom support wall of the base member has its outer lower surface formed to provide means to receive the mouth end of a second container, and thereby facilitate stacking the containers in axial end-to-end relationship.

6. A container of composite construction, comprising, in combination: a glass envelope having a mouth which, when said envelope is disposed in an upright position, is at the upper extremity thereof, the wall of said envelope being seamless, relatively thin and of substantially uniform thickness and distribution, and also being circularly shaped in its horizontal sections, said wall being substantially continuously convexly arcuate along a bottom portion of substantial extent, said bottom portion extending vertically to a maximum diameter horizontal section, said wall tapering inwardly from the maximum diameter horizontal section with convex curvature toward the axis of said envelope and to a concavely arcuate neck portion, said neck portion having an outwardly flared portion terminating in a finish rim at said mouth opening, said concavely arcuate neck portion being the minimum diameter horizontal section of the glass envelope, when the envelope is disposed in the upright position, said wall of the envelope including a vertical cylindrical portion of equal diameter to said maximum diameter horizontal section of said bottom portion and contiguous with said arcuate bottom portion and the adjacent lower extremity of said inwardly tapering portion of said wall, said maximum diameter horizontal section of the bottom portion occurring in the lower one-half of vertical height of said envelope and the minimum diameter horizontal section thereof occurring in the upper one-half of vertical height of said envelope; and a base member formed of a material that is less frangible than said envelope, said base member having a flexible bottom wall nestingly engaging said envelope and a vertical side wall, the latter being assembled in tight annular engagement with said envelope bottom portion along said maximum diameter section thereof, said bottom wall having a level bottom surface for supporting said glass envelope in an upright position with stability, whereby said envelope and base member are secured to each other as a composite container.

7. The container of claim 6, wherein the finish rim at the mouth opening is sealingly engaged by a closure for sealing the contents of the composite container within the glass envelope.

8. The container defined in claim 6, wherein said base member bottom wall is provided with vent means for exhausting air displaced in assembly of the glass envelope into the tightly engaging base member.

9. The container defined in claim 8, wherein said vent means, upon assembly of the glass envelope into nesting engagement with the bottom wall of said base member, is provided with a sealant to seal the space between the glass envelope and the wall of the base member from communication with the outside atmosphere and thereby prevent entry of contaminants therein after the envelope and base member are assembled into form of a composite container.

10. The container defined in claim 9, wherein the sealant comprises a formation of an adhesive introduced into the vent means at the time of assembly of the glass envelope and base member.

11. A composite container comprising, in combination: a glass envelope having a mouth which when said envelope is disposed in a vertical upright position, is at the upper extremity thereof, the wall of said envelope being relatively thin and of substantially uniform thickness and distribution, and also being circularly shaped in its horizontal sections with the maximum diameter horizontal section being below one-half the vertical height of said envelope when in an upright position, said wall being substantially continuously convexly arcuate along a bottom portion of substantial extent contiguous with an adjacent intermeditae portion defining a vertical right cylindrical surface and a contiguous annular surface tapering inwardly therefrom in a convex curvature toward the axis of said envelope to a concavely arcuate neck portion, said neck portion having thereafter an outwardly and upwardly annularly flared portion terminating in a finish rim at said mouth opening, and a base member formed of a material that is less frangible than said envelope, said base member tightly engaging said envelope bottom portion and having a level bottom surface for supporting said glass envelope in an upright position with stability, whereby said envelope and base member are secured to each other to provide a composite container.

References Cited

UNITED STATES PATENTS

| | | | |
|---|---|---|---|
| 2,287,358 | 6/1942 | Prati et al. | 215—12 |
| 2,726,001 | 12/1955 | Cululi | 215—39 |
| 2,971,663 | 2/1961 | Tevander et al. | 215—40 |
| 3,355,045 | 11/1967 | Douglas | 215—13 |

FOREIGN PATENTS

| | | |
|---|---|---|
| 658,699 | 3/1963 | Canada. |
| 536,532 | 5/1941 | Great Britain. |
| 453,375 | 11/1949 | Italy. |
| 542,946 | 3/1956 | Italy. |
| 597,642 | 9/1959 | Italy. |
| 42,459 | 1/1938 | Netherlands. |

DONALD F. NORTON, Primary Examiner

U.S. Cl. X.R.

215—1, 12, 31, 100

PO-1050
(5/69)

UNITED STATES PATENT OFFICE
CERTIFICATE OF CORRECTION

Patent No. 3,482,724      Dated December 9, 1969

Inventor(s) R. A. Heaton

It is certified that error appears in the above-identified patent and that said Letters Patent are hereby corrected as shown below:

Claim 2, col 8, line 32, "bent" should read --vent--

SIGNED AND
SEALED
JUN 9 1970

(SEAL)
Attest:

Edward M. Fletcher, Jr.
Attesting Officer

WILLIAM E. SCHUYLER, JR.
Commissioner of Patents